United States Patent [19]

Southworth et al.

[11] Patent Number: 4,972,717
[45] Date of Patent: Nov. 27, 1990

[54] PRESSURE TRANSDUCER APPARATUS AND METHOD FOR MAKING SAME

[75] Inventors: Robert Southworth, Pawtucket; James L. Tomlinson, North Smithfield, both of R.I.; James P. McAndrews, Attleboro, Mass.

[73] Assignee: Texas Instruments Incorporated, Dallas, Tex.

[21] Appl. No.: 408,657

[22] Filed: Sep. 18, 1989

[51] Int. Cl.$^5$ ............................ G01L 7/08; G01L 9/12
[52] U.S. Cl. ............................................ 73/724; 29/595; 361/283
[58] Field of Search .................. 73/718, 724; 361/283; 29/592.1, 595

[56] References Cited

U.S. PATENT DOCUMENTS

| | | | |
|---|---|---|---|
| 2,667,786 | 2/1954 | Spaulding | 73/724 |
| 3,124,959 | 3/1964 | Pall et al. | 73/715 |
| 3,618,390 | 11/1971 | Frick | 73/718 |
| 3,619,742 | 11/1971 | Rud | 317/246 |
| 3,793,885 | 2/1974 | Frick | 73/718 |
| 3,800,413 | 4/1974 | Frick | 29/592 |
| 4,072,057 | 2/1978 | Yasuhara et al. | 73/718 |
| 4,163,395 | 8/1979 | Medlar et al. | 73/708 |
| 4,169,389 | 10/1979 | Yasuhara et al. | 73/718 |
| 4,345,299 | 8/1982 | Ho | 73/724 |
| 4,388,833 | 6/1983 | Kuwayama | 73/718 |
| 4,398,194 | 8/1983 | Johnston | 340/870 |
| 4,458,537 | 7/1984 | Bell et al. | 73/718 |
| 4,520,675 | 6/1985 | Ziegler | 73/718 |
| 4,612,812 | 9/1986 | Broden | 73/718 |
| 4,653,330 | 3/1987 | Hedtke | 73/756 |
| 4,829,826 | 5/1989 | Valentin et al. | 73/718 |

OTHER PUBLICATIONS

McGraw-Hill Book Company, pp. 434-436.
Review of Scientific Instruments, pp. 444-447.

Primary Examiner—Donald O. Woodiel
Attorney, Agent, or Firm—John A. Haug; James P. McAndrews; Melvin Sharp

[57] ABSTRACT

A pressure responsive variable capacitive transducer is shown in which a flat flexible diaphragm having a capacitor plate disposed thereon is mounted overlying a recess in a substrate having a capacitor plate disposed on the surface of the recess so that the plates are spaced apart a selected distance determined by the depth of the recess. In one embodiment a glass seal is located between the diaphragm and the substrate inwardly of the outer perimeter of the diaphragm while in a second embodiment a glass seal is located outwardly from the outer perimeter of the diaphragm. The substrate is formed with bores adapted to receive electrical connection pins. Electrically conductive traces extend from electrically conductive layers to wells formed in the substrate contiguous with the bores to provide a gradual transition for the traces and an electrically conductive epoxy is infilled to electrically connect the pins to the traces.

19 Claims, 2 Drawing Sheets

PRESSURE TRANSDUCER APPARATUS AND METHOD FOR MAKING SAME

BACKGROUND OF THE INVENTION

The invention relates generally to pressure sensors and more particularly to pressure responsive variable parallel plate capacitive transducers. Such transducers are shown and described, for example, in U.S. Pat. No. 4,716,492, assigned to the assignee of the present invention. A capacitive pressure transducer is shown having a thin ceramic diaphragm mounted in closely spaced, sealed, overlying relation to a ceramic base, with metal coatings deposited on respective opposing surfaces of the diaphragm and base to serve as capacitor plates arranged in predetermined closely spaced relation to each other to form a capacitor. Transducer terminals connected to the capacitor plates are arranged at an opposite surface of the transducer base and a signal conditioning electrical circuit connected to the transducer terminals is mounted on the transducer. A cup-shaped connector body of electrical insulating material is fitted over the electrical circuit and is secured to the transducer by a housing sleeve which has a port for exposing the transducer diaphragm to an applied pressure. The diaphragm is movable in response to variations in pressure applied to the diaphragm to vary the capacitance of the capacitor in accordance with the changes in applied pressure and the electrical circuit provides an electrical output signal corresponding to the applied pressure.

In order to maximize the economies of mass production to lower the transducer cost and thereby make such transducers economically feasible for a wide number of applications including many previously served by low cost mechanical transducers, a standard size package is selected small enough to be received in a large number of applications yet large enough to provide a reliable signal. The size of the package determines the maximum size of the capacitor plates which, along with the gap between the plates determines the capacitance signal. This results in limiting the size of the capacitor plates to a smaller size than would be ideal for many applications and relying on the electrical circuit to properly condition the signal. The circuit on the other hand requires a minimum level of capacitance for it to be able to effectively condition the output signal and this in turn affects the distance or gap required between the capacitor plates to produce the minimum capacitance level. In transducers of the type disclosed in U.S. Pat. No. 4,716,492 distances between the plates are in the order of 10-17 microns.

One approach described in the above patent to provide this selected gap employs a cup-shaped member having a relatively rigid rim secured to a base substrate disposing a bottom of the cup in selected, spaced overlying relation to a capacitor plate on the base substrate. An electrically conductive layer is disposed on the inner surface of the cup bottom to provide the second capacitor plate with the bottom being resiliently flexible to serve as a diaphragm to move the second plate toward and away from the first capacitor plate in response to variation in fluid pressure applied to the outer surface of the cup bottom. The configuration of the cup-shaped member, however, is not conducive to low cost mass manufacturing techniques. Due, in part, to the small sizes involved it is very difficult to obtain consistent flat surfaces on the cup bottoms which are parallel to the substrate surface. Slight variations from device to device cause changes in the capacitance signals produced by the transducers which frequently fall outside the window of values acceptable by the signal conditioning circuitry.

Another approach described in the above patent employs a flat diaphragm element secured to the base substrate in selectively spaced relation thereto by disposing a spacing and securing medium such as a mixture of glass frit including a plurality of balls of glass of selected diameter between the flat diaphragm and the substrate at the periphery of the diaphragm. The glass frit is selected to be fusible at a first temperature at which the balls remain unfused and the mixture is then heated to the fusing temperature of the frit to secure the diaphragm to the substrate at a spacing from the substrate determined by the diameter of the balls. The provision of flat surfaces which extend over the entire diaphragm as well as the base substrate is very conducive to consistent, reproducible results from device to device, however, the use of the glass material to both space and secure the diaphragm to the base substrate. results in problems relating to the effectiveness of the seal between the diaphragm and the base substrate. Although the reason is not completely understood some devices are made which have imperfect seals. During manufacture the diaphragms are biased against the glass by means of a clip to provide a compressive force to cause the diaphragm to move toward the base as the glass melts when the temperature is raised. It may be that the glass balls prevent the surfaces of the diaphragm and the base substrate from being sufficiently close to one another to be wet by the glass at areas of imperfection in their surfaces. That is, although the surfaces are ground unevenness sometimes occurs due to imperfections in the grinding process. In any event it is found that the effectiveness of the seal lacks desired consistency.

SUMMARY OF THE INVENTION

It is therefore an object of the invention to provide a pressure responsive, variable parallel plate capacitive transducer having more consistent spacing between its capacitor plates from one transducer to another. Another object is the provision of a pressure responsive capacitive transducer which has improved yield in its manufacture. Yet another object is the provision of such a transducer which is inexpensive to manufacture yet reliable and long lasting.

Briefly described, a transducer made in accordance with the invention comprises a relatively rigid base or substrate formed of ceramic or similar material having a top formed with a curved recess, preferably spherical in configuration. A flat, circular, flexible diaphragm formed of the same or similar material as the base is disposed in alignment with the recess and is received on the curved surface of the recess so the underside of the diaphragm extends in chordal relation to the curved surface. Electrically conductive layers are centrally disposed on the curved surface of the recess and the bottom surface of the diaphragm. Due to the spherical shape of the recess and the circular shape of the diaphragm the spacing between the respective capacitor plates is determined solely by the curvature of the recess and the particular diameter of the diaphragm. In one embodiment the base substrate is cylindrical having a diameter generally the same as that of the diaphragm with the recess extending essentially across the entire top face of the substrate so that the diaphragm is in chordal relation to the curved surface and sealant material is disposed on the curved surface of the recess between it and the diaphragm at a point spaced slight inwardly of the perimeter of the diaphragm. In another embodiment the base substrate is cylindrical having a diameter greater than the diameter of the diaphragm and sealant material such as glass is received on the curved surface of the recess extending generally from the perimeter of the diaphragm outwardly therefrom.

According to a feature of the invention improved electrical connection is obtained between pins inserted into bores provided in the substrate and a conductive trace leading from conductive layers such as the capacitor plate on the substrate by forming a ramp portion between the curved surface and the bore on which the conductive trace can be effectively screen printed and then placing conductive epoxy in the well provided by the ramp and the space between the bore and the pins and between the diaphragm and the substrate.

BRIEF DESCRIPTION OF THE DRAWINGS

Other objects, advantages and details of the novel and improved capacitive pressure transducer of this invention and method of making appear in the following detailed description of preferred embodiments of the invention, the detailed description referring to the drawings in which.

DESCRIPTION OF PREFERRED EMBODIMENTS

Figure 1:
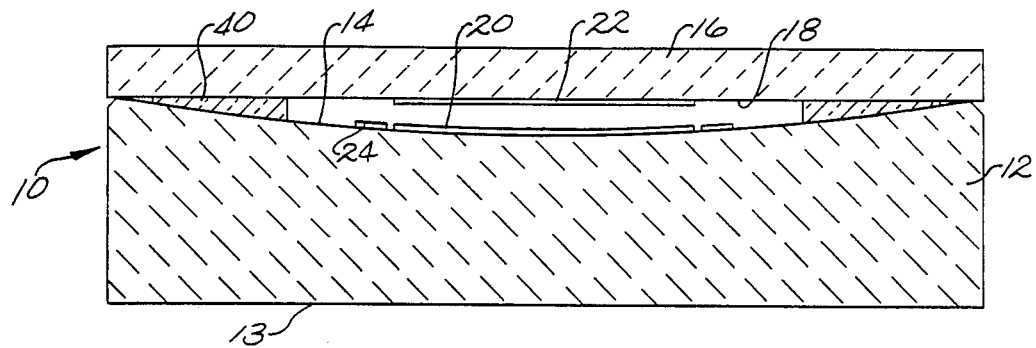
FIG. 1 is a cross sectional view of a first embodiment of a base substrate mounting a circular flexible diaphragm and sealed thereto with the seal extending inwardly of the outer perimeter of the diaphragm showing centrally located capacitor plates whose average distance therebetween is determined solely by the curvature of the top surface of the substrate.
Figure 2:
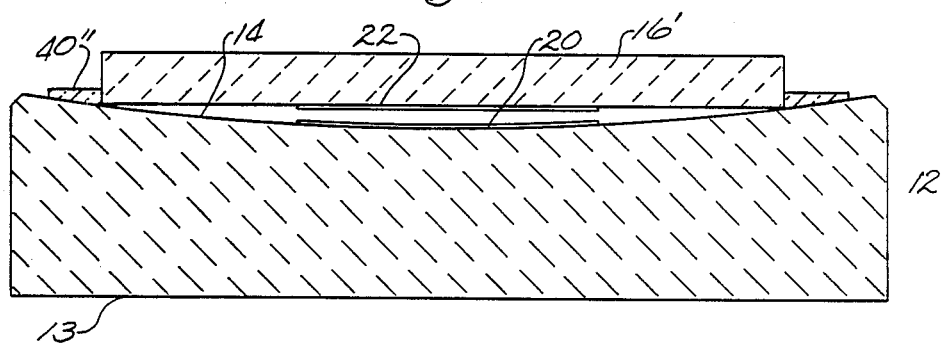
FIG. 2 is a cross sectional view of a second embodiment similar to that of FIG. 1 but with the seal extending outwardly from the perimeter of the diaphragm.
Figure 3:
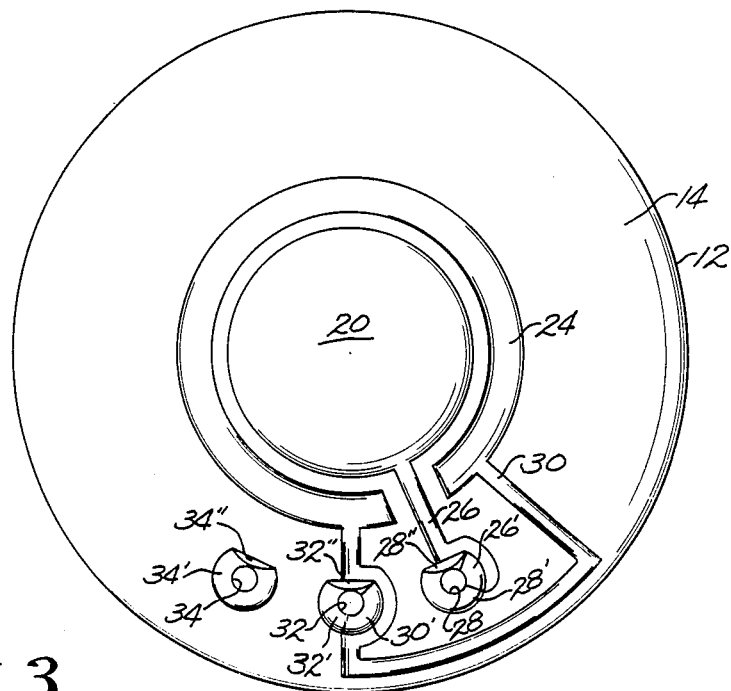
FIG. 3 is a top plan view of the substrate having conductive layers thereon and showing conductive traces extending from the capacitor plate layer and a guard ring layer to a respective ramp and bore in the substrate.
Figure 4:
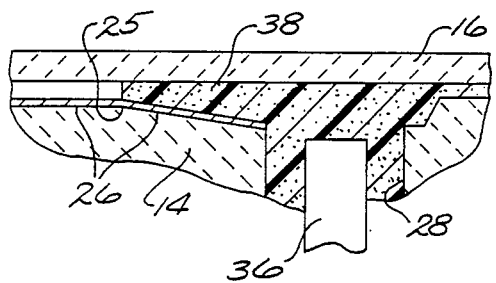
FIG. 4 is a broken away cross sectional view showing a pin extending into a bore with conductive epoxy disposed between the pin and its bore and in the well formed by the ramp between the substrate and the diaphragm.

With reference to FIGS. 1, 2 and 3 a capacitive pressure transducer 10 comprises a relatively rigid cylindrical base substrate 12 having a bottom surface 13 lying in a plane perpendicular to the longitudinal axis of the cylindrical base and a recess or concave top surface 14 as will be described below. A relatively flexible, circular, flat diaphragm member 16 is aligned with and received on the curved top surface 14 and is formed of material having essentially zero hysteresis such as alumina. The base and the diaphragm are each formed of electrically insulative material having similar coefficients of thermal expansion and preferably of the same material. An electrically conductive layer 20, 22 of gold or other highly conductive material is placed on a central portion of the top surface 14 and bottom surface 18 of the diaphragm respectively, by any conventional means such as by screen printing. Layers 20, 22 form first and second capacitor plates spaced apart by a selected distance in the order of 10-17 microns. If desired, a conventional guard ring 24 may also be placed on surface 14 substantially surrounding plate 20. An electrically conductive trace 26 formed on surface 14 extends from plate 20 over to bore 28. Trace 26 can be formed of the same material as plate 20 and can be screened onto surface 14 at the same time as plate 20. A similar trace 30 extends from guard ring 24 to bore 32. A third bore 34 is provided for use in making electrical connection with capacitor plate 22 on diaphragm 16 by means of a conductive trace on surface 18 (not shown). Electrically conductive pins, such as pin 36 shown in FIG. 4, are received in bores 28, 32 and extend into proximity with epoxy wells 28', 32' and 34' respectively formed in surface 14 in communication with the bores. Electrical connection is made between the pins and their respective conductive traces through conductive epoxy 38 such as a conventional epoxy loaded with silver particles infilled in the bore and well areas filling the space between the pins and the bores and between the diaphragm 16 and base substrate 12. The wells are formed with a frusto-conical surface forming an obtuse angle relative to the contiguous portion of surface 14 to insure electrical continuity of the conductive trace, particularly at the point of transition or demarcation from surface 14. In other words, the angle formed between an imaginary horizontal line passing through the point of demarcation 25 shown in FIG. 4 and the frusto-conical surface is within the range of approximately 5-45 degrees and preferably within the range of approximately 12-15 degrees to make the transition sufficiently gradual to facilitate continuity of the trace across the transition.

Generally it is desired to hermetically seal the gap formed between the diaphragm to the substrate. As will be explained in greater detail below in one embodiment such a seal is effected between the diaphragm and the substrate by placing sealant material therebetween. The sealant material, preferably glass material having a coefficient of thermal expansion similar to that of the diaphragm and base, although if desired other sealant material such as epoxy could be used with certain substrate and diaphragm materials, is disposed in the form of an annulus extending radially essentially between the outer periphery and the guard ring with empty pockets formed around bores 28, 32, 34 to facilitate the electrical connection means described above. To enhance the continuity of the seal it is desirable to provide a continuous ring of the sealant around 360 degrees of the substrate both inwardly and outwardly of the wells and for this purpose the inward side of wells 28'', 30'', 32'' are formed with a sharper angle relative to surface 14. In order to avoid having an abrupt change in direction of the conductive traces depth wise, the traces extend around the inward side of the wells to the shallower ramp portion as seen at 28' and 30' in FIG. 4.

The provision of the wells obviates the problem of providing electrical continuity around an angle exceeding ninety degrees which would otherwise be formed between a bore and the substrate surface. Although it is possible to plate around such corners it would require chemical baths and a relatively large capital investment making the resulting device too costly. Screen printing is economical and suitable for applying the traces, however, attempting to print around a ninety degree corner can result in reliability problems. That is, getting the trace into the bore requires using a vacuum to pull the conductor material (ink) into the bore. The flow rate into the bore requires close control to ensure that the ink is not sucked off the corner by the passing gasses which would result in a discontinuous connection in the bore. The shallow ramp provided by the invention allows screen printing onto it without losing continuity over the transition into the well. This arrangement is particularly useful in hermetically sealed devices. There is no need for providing a space between the diaphragm and the substrate to allow the conductive epoxy to flow around the corner of the bore to contact the conductive trace. The result is less sealing glass usage, less need for process control on the sealing process and a more reliable electrical connection.

The capacitor plates are coupled via the pins mounted in the bores provided in the base to electrical circuitry which may be as described in co-assigned, copending U.S. application Ser. No. 278,877, now U.S. Pat. No. 4,875,135, the subject matter of which is incorporated herein by reference. The circuitry conditions signals within a window defined by the characteristics of the circuit. Due in particular to the small gap between the plates it is important to have consistent spacing therebetween from one device to another so that the signals will come within the window provided by the circuit. In the present invention such spacing is determined solely by the curvature of substrate surface 14. As mentioned above, preferably a spherical surface is provided and may be formed by conventional means such as by a shaped lap process involving fixed or free abrasive lapping machine equipped with a lap having a convex spherical surface, a form tool process involving a spinning tool with the desired shape to be imparted in the substrate, or a shape generator process involving rotating a cylindrical tool set at a precise angle which cuts the substrate as the substrate rotates to produce the spherical surface. Such methods can produce very reproducible curved surfaces The diaphragm is placed over the recess with the perimeter of the diaphragm resting on the perimeter of the recess thereby being supported by the substrate with centrally disposed capacitor plates being separated solely by the curved surface. In a cylindrical substrate approximately 0.825 inches in diameter an easily ground radius of the spherical surface in the order of 145 inches will result in a gap of approximately 15 microns at the deepest portion (center) which provides a suitable match for the circuitry described in U.S. Pat. No. 4,875,135.

Figure 5:
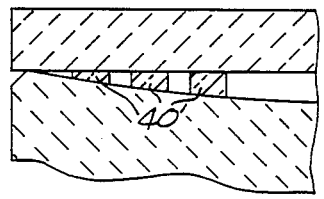
FIG. 5 is a broken away cross sectional view showing a modified seal arrangement.

As seen in FIG. 1 in order to provide an hermetic seal glass material 40 is placed between the substrate and the diaphragm, preferably spaced inwardly slightly from the outer perimeter to ensure that the diaphragm rests directly on the substrate and that no glass can get between the members at their point of contact to affect the spacing. The inner diameter of the glass also serves to define the active portion of the diaphragm with respect to flexing movement Glass material 40 can be applied to substrate 12 by screen printing a suitable frit material in one continuous band, as shown in FIG. 1, except for the windows around the bores, or, if preferred, in a manner similar to that which has been used with the flat diaphragm and substrate referred to above in U.S. Pat. No. 4,716,429 but without the glass balls, in two or more concentric rings as shown at 40' in FIG. 5 to allow extra space for excess glass material, if any. The glass extends upwardly a selected distance above the outer rim of the recess. The diaphragm is placed over the glass frit screened substrate with a selected compressive force biasing the parts together and is then subjected to sufficient heat to melt the glass with the diaphragm coming into engagement with the substrate and the substrate and diaphragm being wetted by the glass.

The curved surface of the substrate not only spaces the capacitor plates very consistently from one device to another it also results in providing an improved seal. That is, even if there is an imperfection in the surface of the diaphragm or the substrate the surfaces will be close enough at the outer edge of the glass to result in wetting of both surfaces due to the decrease in space between the diaphragm and substrate as one goes from the center out to the periphery of the device resulting in fewer occlusions or discontinuities which sometimes occurs with the arrangement referred to above in U.S. Pat. No. 4,716,492 where the spacing between the substrate and diaphragm is determined by the diameter of the glass balls.

Forming both the diaphragm and substrate using the same diameter as shown in FIG. 1 facilitates the correct alignment of the capacitor plates relative to one another, however, it will be realized that the substrate could also extend beyond the recess if so desired.

A modification of the FIG. 1 embodiment is shown in FIG. 2 in which the diaphragm 16' has a smaller diameter than the base substrate 12 and the glass seal 40 is disposed on curved surface 14 extending outwardly from the outer perimeter of the diaphragm. It will be noted that placement of diaphragm slightly to the left or right of the position shown will still result in the same average gap between the capacitor plates. However, the FIG. 1 embodiment has the additional advantage of providing more flexibility in defining the active portion of the diaphragm with respect to flexing movement as well as utilizing the narrowing gap more effectively to promote wetting action between the substrate and the diaphragm during the sealing procedure.

It will be appreciated that curved surfaces other than spherical could be employed and still be used to determine the spacing between the substrate and the diaphragm. For example, a more ellipsoidal configuration could provide improved linear output since the outer portions of the diaphragm do not flex as much as the inner portions, however, such surfaces are more difficult to produce on a reproducible and inexpensive basis.

Further, the base and diaphragm could be made of other suitable material having essentially zero hysteresis such as quartz or sapphire.

It should be understood that though preferred embodiments of the invention have been described by way of illustrating the invention, this invention includes all modifications and equivalents of the disclosed embodiments falling within the scope of the appended claims.

We claim:

1. A capacitive pressure transducer comprising a relatively rigid substrate having an outer periphery and a top, the top having a concave curved surface extending essentially across the entire top to the outer periphery thereof, a relatively flexible diaphragm formed of material having essentially zero elastic hysteresis,
   a layer of electrically conductive material attached to a central portion of the top and the diaphragm respectively, electrically conductive lead means connected to the respective layers and adapted to be coupled to signal conditioning circuit means, the diaphragm disposed on, in contact with and supported by the substrate in alignment with the curved surface and annular securing means received on and in engagement with the curved surface of the substrate adjacent the outer periphery for securing the diaphragm to the substrate.

2. A capacitive pressure transducer according to claim 1 in which the peripheral edge of the diaphragm is received on the curved surface and the securing means hermetically seals the diaphragm to the substrate.

3. A capacitive pressure transducer according to claim 2 in which the substrate and diaphragm are both formed of alumina and the seal comprises a glass material.

4. A capacitive pressure transducer according to claim 1 in which the flexible diaphragm has an outer periphery which is essentially flush with the outer periphery of the substrate.

5. A capacitive pressure transducer according to claim 1 in which the concave surface portion is a portion of a sphere.

6. A capacitive pressure transducer according to claim 1 in which the flexible diaphragm has an outer periphery and the seal is disposed inwardly thereof.

7. A capacitive pressure transducer according to claim 6 in which the seal comprises a plurality of spaced annular sections of glass material extending between the curved surface and the diaphragm.

8. A capacitive pressure transducer comprising a relatively rigid substrate having an outer periphery and a top, the top having a concave surface extending essentially across the entire top to the outer periphery thereof,
a relatively flexible diaphragm formed of material having essentially zero elastic hysteresis,
a respective layer of electrically conductive material attached to a central portion of the top and the diaphragm respectively, electrically conductive lead means connected to the respective layers and adapted to be coupled to electronic circuit means,
the diaphragm disposed over the concave surface and seal means including sealing material extending between the curved surface and the diaphragm for hermetically sealing the diaphragm to the substrate.

9. A method for making a capacitive pressure transducer comprising the steps of
forming a relatively rigid substrate member of electrically insulative material into a cylindrical configuration having a top face,
forming a spherical concave surface configuration extending over essentially the entire top face,
selecting a relatively flexible flat diaphragm of electrically insulative material having a circular outer periphery, having the same diameter as the diameter of the cylindrical configuration of the substrate member,
depositing an electrically conductive layer of material on a central portion of each of the spherical concave surface and the flat diaphragm,
aligning the substrate member and the diaphragm with the diaphragm over the spherical concave surface configuration so that the outer peripheral surface of the substrate member and the diaphragm are flush to precisely position the conductive layers relative to one another, and
placing sealing material between the concave surface and the diaphragm for hermetically sealing the substrate and the diaphragm in their aligned position.

10. A method for making a capacitive pressure transducer comprising the steps of
forming a relatively rigid substrate of electrically insulative material,
forming a recess in the substrate communicating with an outer surface of the substrate, the recess being configured as a portion of a sphere,
intersecting the recess with an imaginary plane to form an imaginary circular outline,
depositing a layer of electrically conductive material on a central portion of the recess underneath the imaginary plane,
selecting a relatively flexible flat diaphragm having an electrically insulative surface on a face thereof,
forming the diaphragm into a circular configuration having a diameter equal to or less than the diameter of the imaginary circular outline,
depositing a layer of electrically conductive material on a central portion of the face on the electrically insulative surface,
aligning the diaphragm and the recess and supporting the diaphragm on the substrate whereby the conductive layers are inherently spaced from one another a preselected average distance, and
placing sealing material between the surface of the recess and the diaphragm for forming an hermetic seal between the diaphragm and the substrate.

11. A method for making a capacitive pressure transducer according to claim 10 in which the diaphragm is formed of material having essentially zero elastic hysteresis.

12. A method for making a capacitive pressure transducer according to claim 11 in which the diaphragm is formed of alumina.

13. A method for making a capacitive pressure transducer according to claim 11 in which the seal is formed by disposing glass material in a plurality of spaced annular rings to provide space for excess glass material without affecting the spacing between the layers of conductive material.

14. A method for making a capacitive pressure transducer according to claim 10 in which the seal is formed by disposing glass material on the surface of the recess inwardly of the imaginary circular outline and raising the temperature of the substrate, diaphragm and glass material sufficiently to fuse the glass material to the substrate and diaphragm.

15. A capacitive pressure transducer comprising a relatively rigid substrate having a top and bottom surface, a relatively flexible, flat diaphragm, electrically conductive layers disposed on the top surface of the substrate and a surface of the diaphragm, means to mount the diaphragm on the substrate so that the conductive layers are aligned with one another in closely spaced sealed relation to one another, electrically conductive lead means connected to the respective layers and adapted to be coupled to electric circuit means, the lead means including at least one bore extending through the substrate from the bottom to the top surface, an electrically conductive pin disposed in the bore, a well formed in the top surface in communication with the bore, a conductive trace on the top surface leading from a respective conductive layer into the well and conductive epoxy filling the space between the pin and the bore and between the diaphragm and the surface of the well to make electrical connection between the pin and the conductive trace.

16. A capacitive pressure transducer according to claim 15 in which the surface of the well on which the conductive trace is disposed forms a slight angle with the contiguous portion of the substrate surface whereby the transition between the well surface and the substrate surface is sufficiently gradual to facilitate continuity of the electrically conductive trace at said transition.

17. A capacitive pressure transducer according to claim 16 in which the angle formed by an imaginary horizontal line passing through the transition point and the well surface in which the conductive trace is disposed is between approximately 12–15 degrees.

18. A capacitive pressure transducer according to claim 17 in which the well surface on which the conductive trace is disposed forms a portion of a frusto-conical ramp surface.

19. A capacitive pressure transducer according to claim 18 in which a portion of the well is defined by a second surface having a greater angle with the said imaginary horizontal line on the side of the bore closest to the center of the substrate to provide more undisturbed substrate surface inwardly of the bores for placement of sealing material to seal the diaphragm to the substrate.

* * * * *